United States Patent
Bower, III et al.

(10) Patent No.: US 10,721,067 B2
(45) Date of Patent: Jul. 21, 2020

(54) SECURE PROCESSOR FOR MULTI-TENANT CLOUD WORKLOADS

(71) Applicant: Lenovo Enterprise Solutions (Singapore) Pte. Ltd., Singapore (SG)

(72) Inventors: Fred A. Bower, III, Durham, NC (US); William G. Holland, Cary, NC (US); Scott Kelso, Cary, NC (US); Christopher L. Wood, Chapel Hill, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 208 days.

(21) Appl. No.: 15/233,000

(22) Filed: Aug. 10, 2016

(65) Prior Publication Data

US 2018/0048470 A1    Feb. 15, 2018

(51) Int. Cl.

| | |
|---|---|
| *H04L 9/16* | (2006.01) |
| *H04L 9/32* | (2006.01) |
| *G06F 21/71* | (2013.01) |
| *G06F 21/85* | (2013.01) |
| *G06F 11/36* | (2006.01) |
| *G06F 21/72* | (2013.01) |
| *G06F 12/0802* | (2016.01) |
| *G06F 21/78* | (2013.01) |
| *H04L 9/08* | (2006.01) |

(52) U.S. Cl.
CPC .............. *H04L 9/16* (2013.01); *G06F 11/362* (2013.01); *G06F 11/3648* (2013.01); *G06F 12/0802* (2013.01); *G06F 21/71* (2013.01); *G06F 21/72* (2013.01); *G06F 21/78* (2013.01); *G06F 21/85* (2013.01); *H04L 9/0894* (2013.01); *H04L 9/3271* (2013.01); *G06F 2212/1008* (2013.01); *G06F 2212/281* (2013.01); *G06F 2212/402* (2013.01); *H04L 2209/24* (2013.01)

(58) Field of Classification Search
None
See application file for complete search history.

(56) References Cited

U.S. PATENT DOCUMENTS 6,895,506 B1 * 5/2005 Abu-Husein ......... G06F 21/121
380/29
8,568,224 B1 * 10/2013 Itkis .................... G07F 17/3218
455/411

(Continued)

*Primary Examiner* — Saleh Najjar
*Assistant Examiner* — Michael W Chao
(74) *Attorney, Agent, or Firm* — Jeffrey Streets

(57) ABSTRACT

A CPU package includes an encryption and decryption module disposed in a communication path between an instruction path of a processor core and a data register that is externally accessible through a debug port, and a key store accessible to the module. The module is configured to encrypt and store data in the data register for each of a plurality of processes being handled in the instruction path, wherein data owned by each process is encrypted and decrypted by the module using an encryption key assigned to the process. The key store is configured to store the encryption key assigned to each of a plurality of processes, wherein the key store is inaccessible outside the CPU package. The data is only decrypted for a requesting process having a process identifier that matches the process identifier stored in the processor data structure along with the requested data.

17 Claims, 3 Drawing Sheets

(56) References Cited

U.S. PATENT DOCUMENTS

| | | | | |
|---|---|---|---|---|
| 8,751,819 B1* | 6/2014 | Langsworth | | H04L 9/0637 |
| | | | | 380/28 |
| 9,037,870 B1* | 5/2015 | Zheng | | G06F 12/1408 |
| | | | | 380/273 |
| 9,298,894 B2* | 3/2016 | Boivie | | G06F 21/125 |
| 9,967,319 B2* | 5/2018 | Savelieva | | H04L 63/0428 |
| 9,971,909 B2* | 5/2018 | Mittal | | G06F 12/1441 |
| 10,200,406 B1* | 2/2019 | Powers | | H04L 63/1491 |
| 10,303,879 B1* | 5/2019 | Potlapally | | G06F 21/57 |
| 10,303,901 B2* | 5/2019 | Goto | | G06F 21/52 |
| 10,325,118 B2* | 6/2019 | Chhabra | | G06F 21/72 |
| 10,509,734 B2* | 12/2019 | Durham | | G06F 12/1408 |
| 10,547,604 B2* | 1/2020 | Isozaki | | G06F 21/575 |
| 2002/0051536 A1* | 5/2002 | Shirakawa | | G06F 21/71 |
| | | | | 380/45 |
| 2002/0101995 A1* | 8/2002 | Hashimoto | | G06F 9/30003 |
| | | | | 380/277 |
| 2003/0123672 A1* | 7/2003 | Srinivasan | | H04L 9/0891 |
| | | | | 380/285 |
| 2003/0126458 A1* | 7/2003 | Teramoto | | G06F 12/1466 |
| | | | | 713/194 |
| 2004/0255199 A1* | 12/2004 | Yamashita | | G06F 21/629 |
| | | | | 714/37 |
| 2005/0105738 A1* | 5/2005 | Hashimoto | | G06F 21/72 |
| | | | | 380/277 |
| 2005/0289397 A1* | 12/2005 | Haruki | | G06F 11/3648 |
| | | | | 714/38.1 |
| 2006/0005260 A1* | 1/2006 | Haruki | | G06F 21/57 |
| | | | | 726/27 |
| 2006/0010308 A1* | 1/2006 | Haruki | | G06F 9/3009 |
| | | | | 712/228 |
| 2006/0015748 A1* | 1/2006 | Goto | | G06F 21/52 |
| | | | | 713/190 |
| 2006/0262928 A1* | 11/2006 | Bar-El | | G06F 21/78 |
| | | | | 380/228 |
| 2007/0043978 A1* | 2/2007 | Cruzado | | G06F 21/85 |
| | | | | 714/38.1 |
| 2008/0114989 A1* | 5/2008 | Anbalagan | | G06F 21/57 |
| | | | | 713/189 |
| 2008/0205651 A1* | 8/2008 | Goto | | G06F 21/71 |
| | | | | 380/277 |
| 2008/0282087 A1* | 11/2008 | Stollon | | G01R 31/31719 |
| | | | | 713/171 |
| 2009/0172414 A1* | 7/2009 | Dahan | | G06F 21/72 |
| | | | | 713/190 |
| 2011/0167278 A1* | 7/2011 | Goto | | G06F 21/52 |
| | | | | 713/193 |
| 2013/0022201 A1* | 1/2013 | Glew | | G06F 21/72 |
| | | | | 380/268 |
| 2013/0191649 A1* | 7/2013 | Muff | | G06F 21/72 |
| | | | | 713/190 |
| 2013/0191651 A1* | 7/2013 | Muff | | G06F 12/1027 |
| | | | | 713/193 |
| 2014/0013123 A1* | 1/2014 | Khazan | | G06F 21/602 |
| | | | | 713/189 |
| 2014/0037093 A1* | 2/2014 | Park | | H04L 9/0816 |
| | | | | 380/277 |
| 2014/0089667 A1* | 3/2014 | Arthur, Jr. | | G06F 21/57 |
| | | | | 713/171 |
| 2017/0010982 A1* | 1/2017 | Avanzi | | G06F 12/1408 |
| 2017/0063544 A1* | 3/2017 | Oxford | | H04L 63/0435 |
| 2017/0090800 A1* | 3/2017 | Alexandrovich | | G06F 3/0622 |
| 2017/0310479 A1* | 10/2017 | Sato | | G06F 21/60 |
| 2018/0196827 A1* | 7/2018 | Sundaram | | H04L 29/06 |
| 2018/0204025 A1* | 7/2018 | Chhabra | | G06F 21/72 |

* cited by examiner

SECURE PROCESSOR FOR MULTI-TENANT CLOUD WORKLOADS

BACKGROUND

Field of the Invention

The present invention relates to systems and methods of maintaining security among workloads in a multi-tenant cloud environment.

Background of the Related Art

In a hosted workload environment, where multiple workloads may share the same processor simultaneously, all workloads have to grant trust to the host. This is due to the fact that the operating system and other similar software (such as debuggers and other hardware analysis tools) can inspect all detailed processor state data. However, in a multi-tenant environment, there is a potential lack of security or trust problem in that a workload run by one tenant may be able to read data belonging to another workload run by another tenant. There are no known solutions to solving the trust problem at the processor level.

Existing technology encrypts data that is stored in off-chip storage in order to prevent unauthorized access by processes or tools that have access to that off-chip storage. However, data within the CPU chip package is currently only protected by isolating one workload from another. Typically, one workload is isolated from another workload by granting sole ownership of the CPU or entire server to one specific workload at a time. This isolation is inefficient for cloud or virtualized environments where multiple workloads share the same hardware to achieve better utilization and economies of scale.

BRIEF SUMMARY

One embodiment of the present invention provides a CPU package comprising a first processor core forming an instruction path, a data register that is externally accessible through a debug port, a first encryption and decryption module disposed in a communication path between the instruction path and the data register, and a key store accessible to the first encryption and decryption module. The first encryption and decryption module is configured to encrypt and store data in the data register for each of a plurality of processes being handled in the instruction path, wherein data owned by each process is encrypted and decrypted by the first encryption and decryption module using an encryption key assigned to the process. Furthermore, the key store is configured to store the encryption key assigned to each of a plurality of processes, wherein the key store is inaccessible outside the CPU package.

Another embodiment of the present invention provides a method comprising a CPU package executing a plurality of processes, wherein each process is assigned a process identifier, assigning an encryption key to each of the plurality of processes, and storing, for each of the processes, the process identifier assigned to the process in association with the encryption key assigned to the process in a key store that is not accessible outside the CPU package. The method further comprises encrypting, for one or more of the processes, processor state data owned by a process using the encryption key assigned to the process and storing the encrypted processor state data and the process identifier in an externally accessible processor data structure, and decrypting a requested portion of the encrypted processor state data stored in the processor data structure and providing the decrypted processor state data to a requesting process in response to receiving a read request from the requesting process having a process identifier that matches the process identifier stored in the processor data structure along with the requested processor state data.

DETAILED DESCRIPTION

Figure 1:
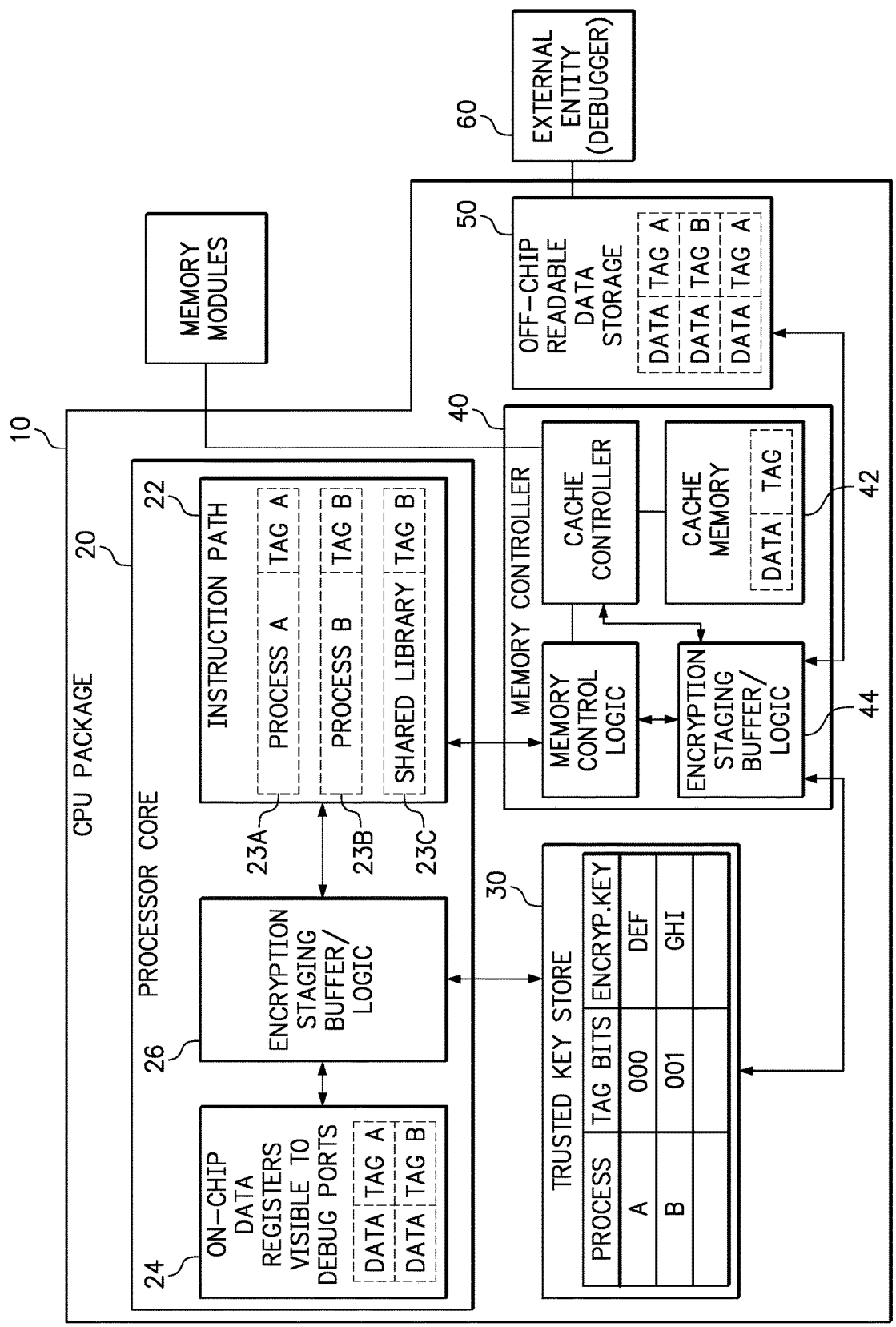
FIG. 1 is a diagram of a CPU package including a trusted key store according to one embodiment of the present invention.

One embodiment of the present invention provides a CPU package comprising a first processor core forming an instruction path, a data register that is externally accessible through a debug port, a first encryption and decryption module disposed in a communication path between the instruction path and the data register, and a key store accessible to the first encryption and decryption module. The first encryption and decryption module is configured to encrypt and store data in the data register for each of a plurality of processes being handled in the instruction path, wherein data owned by each process is encrypted and decrypted by the first encryption and decryption module using an encryption key assigned to the process. Furthermore, the key store is configured to store the encryption key assigned to each of a plurality of processes, wherein the key store is inaccessible outside the CPU package.

Optionally, the first encryption and decryption module may be further configured to assign an encryption key to each of the plurality of processes being handled in the instruction path. In a separate option, the data register or other data structure may be configured to store the encrypted data along with a process identifier or tag assigned to the process that owns the data. Still further, each process identifier may be assigned to a process by an operating system that is running on the CPU package.

In a further embodiment, the CPU package may further comprise a memory controller including cache memory, and a second encryption and decryption module disposed in a communication path between the first processor core and the cache memory. The second encryption and decryption module may be configured to encrypt and store data in the cache memory for each of a plurality of processes being handled in the instruction path, wherein data owned by each process is encrypted and decrypted by the second encryption and decryption module using an encryption key assigned to the process, wherein the second encryption and decryption module has access to the key store.

In a still further embodiment, the CPU package may further comprise a memory controller including cache memory, and a second encryption and decryption module disposed in a communication path between the first processor core and the cache memory, wherein the second encryption and decryption module is configured to encrypt and store data in the cache memory for each of a plurality of processes being handled in the instruction path, wherein data owned by each process is encrypted and decrypted by the second encryption and decryption module using an encryption key assigned to the process. However, the CPU package may further comprise a second key store that is accessible to the second encryption and decryption module and is configured to store the encryption key assigned to each of the plurality of processes, wherein the second key store is inaccessible outside the CPU package. Optionally, the first and second key stores may store a different encryption key for each of the plurality of processes.

The CPU package may further comprise a second processor core, wherein the first and second processor cores share a single key store.

Still further, the CPU package may further comprise a plurality of externally accessible data structures, and a plurality of encryption and decryption modules, each encryption and decryption module controlling data into and out of one of the externally accessible data structures.

Another embodiment of the present invention provides a method comprising a CPU package executing a plurality of processes, wherein each process is assigned a process identifier, assigning an encryption key to each of the plurality of processes, and storing, for each of the processes, the process identifier assigned to the process in association with the encryption key assigned to the process in a key store that is not accessible outside the CPU package. The method further comprises encrypting, for one or more of the processes, processor state data owned by a process using the encryption key assigned to the process and storing the encrypted processor state data and the process identifier in an externally accessible processor data structure, and decrypting a requested portion of the encrypted processor state data stored in the processor data structure and providing the decrypted processor state data to a requesting process in response to receiving a read request from the requesting process having a process identifier that matches the process identifier stored in the processor data structure along with the requested processor state data.

In one embodiment, the method may further comprise preventing decryption of a requested portion of the encrypted processor state data stored in the processor data structure in response to receiving a read request from the requesting process having a process identifier that does not match the process identifier stored in the processor data structure along with the requested processor state data.

The externally accessible processor data structure may, for example, be selected from a buffer, register and cache memory. In one option, all externally accessible processor state data that is stored within the CPU package is encrypted with an encryption key that is specific to the process that owns the data. In another option, the externally accessible processor data structure is accessible to an external debugger application through a debugger port.

In a further embodiment, the method may further comprise a selected process, from among the one or more processes, granting access to data owned by the selected process to a second process by allowing the second process to use the process identifier of the selected process. For example, the second process may be a debugger process or a shared library. Still further, the step of the selected process granting access to data owned by the selected process to a second process, may include the operating system automatically associating the process identifier of the selected process with the second process in response to the selected process calling the second process.

In another embodiment, the method may further comprise detecting that an external entity located outside of the CPU package is attempting to access the externally accessible data structure, and determining whether the external entity has a process identifier that matches the process identifier stored along with the data being accessed. For example, the external entity may be a debugger application running on a different computer that is externally connected to the CPU package through a debug header. The method may optionally include exporting the process identifier from a process that is to be debugged to the debugger application.

In yet another embodiment, the process identifier may be a plurality of tag bits. Accordingly, the method may include the CPU package associating the tag bits of a process with all instructions of the process and all data owned by the process. One method may use the tag bits associated with an instruction as an index into the key store, and use the encryption key that is stored in the key store in association with the tag bits to decrypt the data in the processor data structure. Still further, the method may use the tag bits associated with an instruction as an index into the key store to retrieve the associated encryption key from the trusted key store, and use the encryption key that is stored in the key store in association with the tag bits to encrypt data owned by a process that includes the instruction.

In a further embodiment, the method may further comprise the CPU package determining that a process is a new process in response to handling a process with a process identifier that is not found in the key store or other table of active processes. The method may then assign a key-tag pair to the new process, wherein the key-tag pair is unique among other active processes, and store the key-tag pair in the key store. Optionally, a key-tag pair may be reused or reassigned to a new process after the key-tag pair is no longer in use by any other active process.

Embodiments of the present invention prevent unauthorized access to processor state data on a per-process basis. All data stored within a CPU is associated with an encryption key that is specific to the process that generated the data. Any movement of data onto or off of an externally readable data structure of the CPU will result in an encryption or decryption action, respectively. Externally readable processor data structures include, for example, buffers, registers and cache memory.

For example, data stored in registers that can be read by a debugger process is encrypted. If the CPU needs access to the data stored in those registers, the data must be decrypted. If a debugger process attempts access to the data stored in those registers, the debugger process would obtain either the encrypted data or a redacted representation of the register state (i.e. an indication that the register is unreadable because of permission deficiency). The tenant process that owns the data may, optionally, grant trust to the debugger process or other cooperating trusted process, such as a shared library, on a case by case basis. When the tenant process grants trust to another process, that other process may receive decrypted data owned by the tenant process. However, a grant of trust from the tenant process only extends to the data that is owned by the tenant process. In other words, a grant of trust from a tenant process (the "grantor") to another process (the "grantee") can convey an access privilege no broader than the access privilege of the tenant process.

As data and instructions traverse the CPU pipeline data path within the CPU package, the CPU tracks the identity of the process (i.e., via process ownership tag bits) that owns the data and the instructions. If a process has permission to access certain data, then the CPU executes logic to decrypt the data for the process. A process that is attempting access to the encrypted data will use its process identifier, such as a set of tag bits, as an index into a key store that is present on the CPU and not accessible to entities outside the CPU.

The key store maintains a list of active processes and, for each active process, an associated tag (i.e., tag bits) and a unique encryption key.

In one embodiment, an encryption staging buffer or logic module, also referred to as an encryption and decryption module, may be associated with any data storage structure that can be inspected by an entity outside of the physical processor package. The encryption staging buffer or logic module is disposed between an access point of the data storage structure and the decrypted CPU data, such that the encryption staging buffer or logic module can encrypt or decrypt data on its way to and from the data storage structure.

In another embodiment, an encryption staging buffer or logic module may be associated with on-chip data storage structures, such as L1 cache. These on-chip data storage structures may store data for multiple processes, such that inter-process communication can occur through a cache data structure. Embodiments of the present invention may be implemented to restrict this inter-process communication so that an unauthorized process is prevented from accessing data owned by another process.

In order to encrypt data from a process or decrypt data requested by a process, the encryption staging buffer or logic module uses the process identifier associated with the process to retrieve the associated encryption key from the trusted key store. The encryption staging buffer or logic module then uses the process-specific encryption key to encrypt data being stored or decrypt data being read by a process having the associated process identifier. When storing data to the data storage structure, the encryption staging buffer or logic module encrypts the data using the process-specific encryption key and delivers the encrypted data to the data storage structure for storage. When retrieving data from the data storage structure, the encryption staging buffer or logic module uses the process-specific encryption key to decrypt the data being accessed and delivers the decrypted data to the requesting process, subject to the requesting process having a process identifier that is the same as the process identifier of the process that stored the data. In other words, only the process that owns the data or a process that has received permission from the process that owns the data will be able to access the data.

In one embodiment, the encryption staging buffer or logic module may implement a redacting mechanism, for example in which no data is provided to an externally readable data structure unless the requesting process or entity has been authenticated by having a process identifier that matches the process identifier associated with the requested data. If the requesting process or entity can provide evidence of authenticity (i.e., the matching process identifier), then the encryption staging buffer or logic module may decrypt the requested data and provide the decrypted data to the requesting process or entity. However, if the requesting process or entity cannot provide evidence of authenticity, then the externally readable data structure would have its data nullified and the encryption staging buffer or logic module would simply disallow transfer from the chip-internal storage element to the externally readable location.

In one option, all external chip data accesses may utilize a challenge-response using an encrypted exchange of information to validate the authenticity of the requesting element. In the case of a shared library, this challenge-response mechanism may be used to ensure that the instance of the library acting on behalf of a given process is only able to see data for that process. For example, the CPU package may support process identifier inheritance (or process tag bit inheritance) by the shared library or other linked process, such that the shared library may only assume the identity of the process that is using the shared library in a given thread of execution. When code from the shared library is loaded, the OS kernel may dynamically tag or associate the process identifier of the executing process with the shared library code. For example, this tagging of a dynamic instruction stream may occur in a fetch unit of the processor, after the instruction is pulled from the instruction cache.

Process and thread identity is preferably assigned by the operating system (OS) and may be conveyed to the CPU package by the OS kernel. For example, process identity may take the form of a tag that is unique among active processes, such as a series of tag bits. In one option, a process is assigned a tag that is used to keep processes from having access to each other's memory, and this same tag could be used further as an index into the key store for protecting processor state data from being accessed by other processes. However, since some processes may have privileged access to all memory, reusing such a tag might allow those processes to gain access to the encrypted data of other processes. In a further option, the OS kernel may assign a separate tag to each process for the purpose of protecting processor state data from being accessed by other processes.

A process may grant trust to another process or entity using any known method of granting trust. For example, a granting process may give a "secret" to a second process that proves trust was established. The second process (the grantee) may then present the secret (preferably including elements of identifying information that could not be forged) to allow the second process to impersonate the granting process for access to processor state data. In one example, the "secret" may be a password. Accordingly, the "secret" may be used to authenticate a process rather than the process identifier, although the "secret" may be used in the same manner described for the process identifier.

In order to validate authenticity of a requesting entity, a "challenge-response" process may be used between the requesting entity (i.e., the process that is requesting data) and owning entity (i.e., the process that owns the data). For example, a secret (such as a password) may be used the owner process (or arbiter process, such as the OS kernel) to securely transmit a challenge to the requesting process, whereupon the requesting process must return a response with an encrypted value that is some predetermined function of the originally offered information, thus proving that it was able to decrypt the challenge. For instance, in the computer network authentication protocol known as Kerberos, the challenge is an encrypted integer N, while the response is the encrypted integer N+1, proving that the other end was able to decrypt the integer N. In other variations, a hash function operates on a password and a random challenge value to create a response value.

Optionally, the OS kernel may act as arbiter of such data access requests, possibly including use of a Trusted Platform Module (TPM) which can be used for secure storage of encryption keys. All of the storage locations are matters of preferred embodiments, wherein the key store within the CPU package never externalizes its encryption keys.

A single CPU package may include multiple processor cores that may share a single encryption key store for that CPU package. However, in a compute node having multiple CPU packages, a process may run on both packages and has the same need for data protection. Optionally, the process may be separately registered with each CPU package, such that the process has a separate process identifier or tag and encryption key on each CPU package. Therefore, the process is independently protected on each CPU package. Accordingly, the process is authorized to access its own data on each CPU package, but uses different encryption keys on each CPU package in a manner that is transparent to the process.

Embodiments of the present invention may provide a memory controller with a security mechanism for protecting data, where the security mechanism is analogous to that disclosed for the processor state data within the processor core. Accordingly, the memory controller may have its own encryption staging buffer or logic module, and have access to a second key store storing tag-key pairs for use by the memory controller. Optionally, a process identifier or tag that has been assigned to the process by the OS kernel may be reused in the memory controller, although the process identifier or tag may be associated with a different encryption key. Optionally, the memory controller may have its own encryption staging buffer and logic module, but utilize the same key store used by the processor core.

Various embodiments of the present invention or various aspects of one or more of the embodiments of the present invention may take the form of a computer program product comprising a non-transitory computer readable storage medium having program instructions embodied therewith, wherein the program instructions are executable by a processor to cause the processor to perform a method of the present invention. A separate description of the methods will not be duplicated in the context of a computer program product.

FIG. 1 is a diagram of a CPU package 10 including a first processor core 20 forming an instruction path 22, data registers 24 that are externally accessible through a debug port, and an encryption and decryption module 26 disposed in a communication path between the instruction path 22 and the data registers 24. The CPU package also includes a key store 30 accessible to the first encryption and decryption module 26. As previously described, the encryption and decryption module 26 is configured to encrypt and store data in the data registers 24 for each of a plurality of processes being handled in the instruction path. For example, the plurality of processes are shown schematically to include a Process A (23A) and a Process B (23B), but any number of processes may be handled in accordance with embodiments of the present invention. Data owned by each process is encrypted and decrypted by the encryption and decryption module 26 using an encryption key assigned to the process. Furthermore, the key store 30 is configured to store the encryption key assigned to each of a plurality of processes, wherein the key store is inaccessible outside the CPU package 10. As shown, the key store 30 is illustrated as a data table including a plurality of records (rows), wherein each row includes a process identifier, tag bits and an encryption key. However, the key store may store the data in any suitable format other than a table.

Optionally, the encryption and decryption module 26 may be further configured to assign an encryption key to each of the plurality of processes being handled in the instruction path 22. In a separate option, the data registers 24 or other data structures may be configured to store the encrypted data along with a process identifier or tag assigned to the process that owns the data. Still further, each process identifier may be assigned to a process by an operating system that is running on the CPU package.

In a further embodiment, the CPU package 10 may further comprise a memory controller 40 including cache memory 42, and a second encryption and decryption module 44 disposed in a communication path between the first processor core 20 and the cache memory 42. The second encryption and decryption module 44 may be configured to encrypt and store data in the cache memory 42 for each of the plurality of processes being handled in the instruction path 22, wherein data owned by each process is encrypted and decrypted by the second encryption and decryption module 44 using the encryption key assigned to the process, wherein the second encryption and decryption module 44 has access to the key store 30. The second encryption and decryption module 44 may encrypt and decrypt data to and from the cache memory 42 in the same or similar manner as the encryption and decryption module 26 encrypts and decrypts data to and from the registers 24.

Still further, the CPU package may further include other externally accessible data structures, such as the off-chip readable data storage 50 and an encryption and decryption module controlling data into and out of each of the externally accessible data structures. While each externally accessible data structure may have its own encryption and decryption module, the illustration shows the encryption and decryption module 44 controlling data in and out of both the cache memory 42 and the off-chip readable data storage 50.

As shown in FIG. 1, Process A (23A) has been assigned a process identifier in the form of a tag (Tag A) and Process B (23B) has been assigned a process identifier in the form of a tag (Tag B). Accordingly, instructions traversing the instruction path 22 and data being stored in the data registers 24 are appended or accompanied by the tag corresponding to the process that owns the instruction or data. In this manner, a process that owns encrypted data stored in the data registers 24 will have permission for the encryption and decryption module 26 to decrypt and provide that data to the process. Only a process that has a tag matching the tag associated with the data in the registers will be able to obtain the data. Any number of data registers may be controlled in this manner.

In this illustration, a shared library 23C has been called by Process B (23B), such that the shared library 23C has inherited Tag B and receives the same permissions to access data stored in the data registers 24 in association with Tag B. In other words, the encryption and decryption module 26 sees the shared library 23C as being Process B (23B) when the shared library is found to have the Tag B.

Still further, an external entity 60, such as a debugger, is shown in communication with the data storage structure 50. If the external entity attempts to reach a particular portion of the data in the data storage structure 50 and if the external entity is authenticated by presenting the tag associated with the requested data, then the encryption and decryption module 44 will decrypt the requested data and provide the data to the external entity 60.

Figure 2:
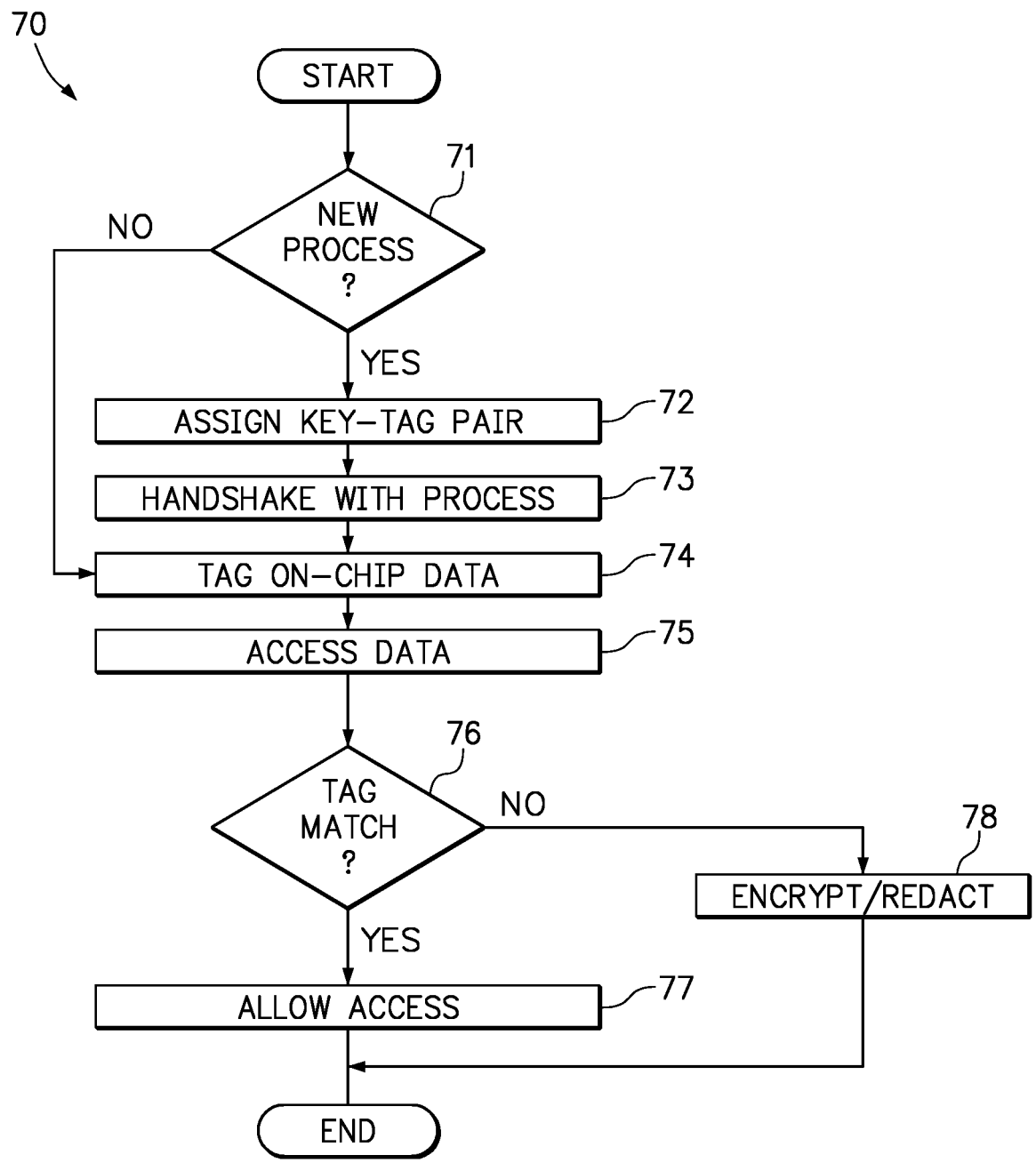
FIG. 2 is a flowchart of a method of protecting access to processor state data according to another embodiment of the present invention.

FIG. 2 is a flowchart of a method 70 of protecting access to processor state data. This method may be used to implement both embodiments illustrated in FIG. 1. In step 71, the CPU package instruction fetch and decode processing logic examines a tag or process ID assigned to a given process by the OS kernel, and references that tag or process ID to a table of active processes with encryption key assignments in the CPU package. For example, if the CPU package is handling a process with a tag or process ID that is not found in the table of active processes, then the process is determined to be a new process. The table of active process may be a trusted key store.

If the process is a new process, then step 72 assigns a key-tag pair to the new process. This key-tag pair is stored in the trusted key store and is unique among other active processes. Since the key-tag pair is assigned within the CPU, it is possible to reuse a key-tag pair after the key-tag pair is no longer in use by any other active process. In step 73, the CPU package performs a handshake between with the OS kernel, which must be a trusted process since the OS kernel is identifying the new workload to the CPU. The handshake is the validation that the submitter of the new task is indeed the trusted OS kernel and can optionally include additional privilege (process IDs) that the process is allowed to assume the identity of for purposes of sharing data. The handshake is only needed if the process has a new process identifier that does not already exist in the trusted key store or if no trust with the OS/hypervisor kernel.

In one option for the handshake, the OS kernel may have a special instruction set that only the OS kernel can run, such as a privileged mode operation. Accordingly, the OS kernel may use the special instruction set to assign identifying information (i.e., a process ID) to each process. In another option for the handshake, a process may receive a secured authentication token from the CPU package that the process would then pass through with any subsequent accesses to the CPU. Such a secured authentication token would then bind the presenting process to a specific process privilege. For example, the secured authentication token may be an encrypted data string. Unfortunately, the encrypted data string has to be stored somewhere, such that the encrypted data string may be an easier target than accessing the OS kernel.

In step 74, on-chip data is stored along with the tag assigned to the process that owns the data. For example, an address generation unit (AGU) may append the on-chip data with the tag of the owner process as the data transits from cache memory into the CPU core and back.

In step 75, an external entity (i.e., a component located outside of the CPU package) attempts access to the off-chip readable data structure. The external entity could be a debugger application running on a different computer that is externally connected to the CPU package through a debug header. A debugger application running on the same computer including the CPU package would be just another process that the OS kernel is running.

In step 76, the method determines whether the requesting entity has evidence of authenticity in the form of tag that matches the tag of the process that owns the data. If the requesting entity is a process running on the CPU package, then access to particular data is granted if the requesting process has a tag matching the tag stored with the requested data. For an external debugger, you'd need to export the tokens from the kernel/processes that are going to be debugged/shared and then import them into the debugger. Then, there would need to be a means for the debug port to allow the debugger to present these tokens to the CPU package to validate its entitlement to read data in the clear. For either an internal process or an external entity, if the requesting process or entity has a matching tag, then the process or entity is allowed access to the requested data in step 77. More specifically, allowing access to the requested data involves decrypting the data. The encryption/decryption logic is a "bump in the wire". When a process or entity attempts to read a register, the process or entity submits a read command along with a tag or process identifier (ID). If the tag or process ID in the read command matches the tag or process ID stored along with the requested data, then the requested data is decrypted and provided to the requesting process or entity. If the tag or process ID in the read command does not match the tag or process ID stored along with the requested data, then the requesting process or entity will receive either unintelligible data or some representation of a "not authorized" message. The process of authenticating a process and providing decrypted data is transparent to an authorized process, except perhaps the latency of access introduced by the logic. However, if the requesting entity does not have a matching tag, then the request data may be either provided in an encrypted form or redacted in step 78.

Figure 3:
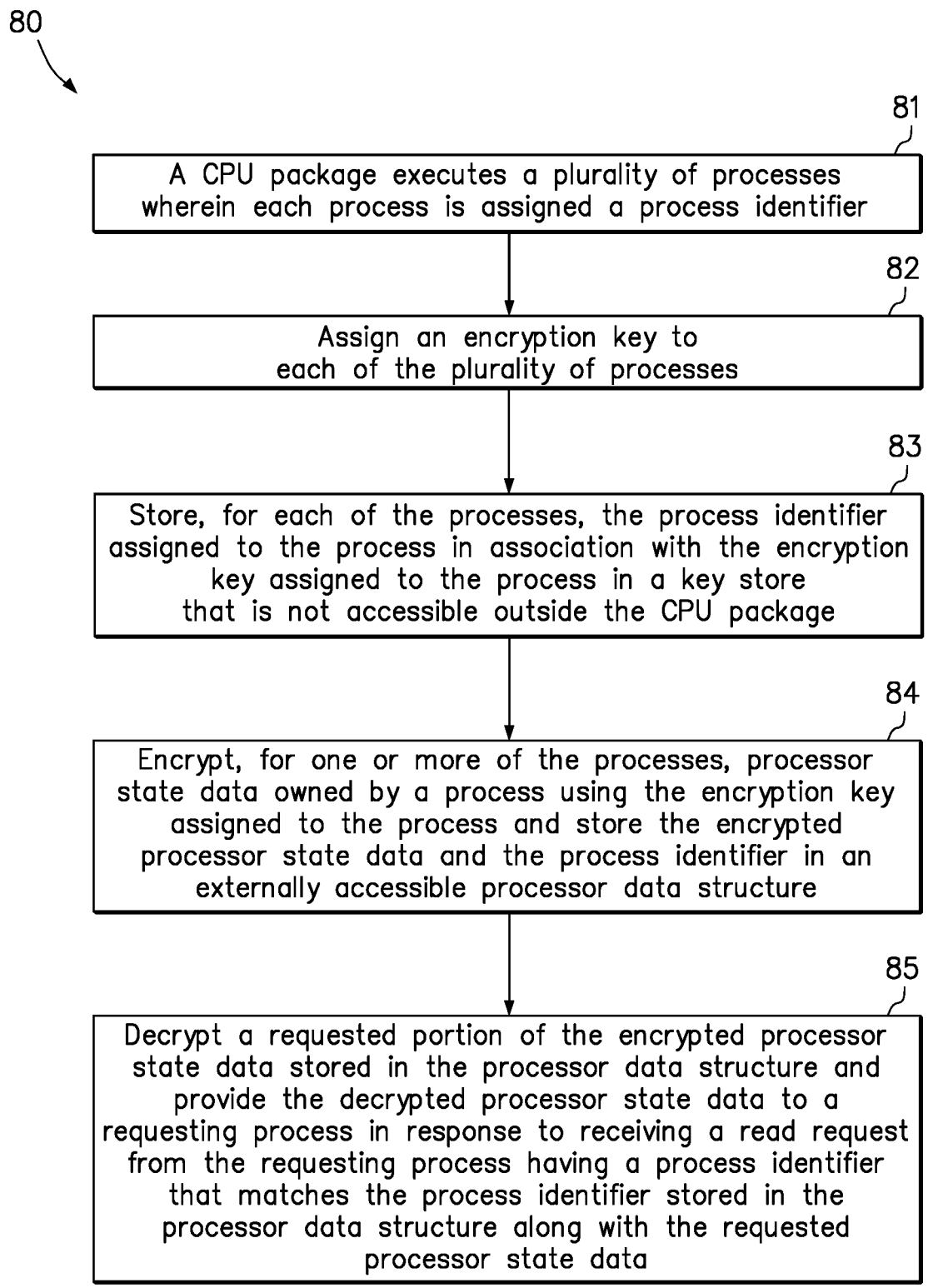
FIG. 3 is a flowchart of a method according to yet another embodiment of the present invention.

FIG. 3 is a flowchart of a method 80 of another embodiment of the present invention. In step 81, a CPU package executes a plurality of processes, wherein each process is assigned a process identifier. In step 82, the method assigning an encryption key to each of the plurality of processes. Step 83 includes storing, for each of the processes, the process identifier assigned to the process in association with the encryption key assigned to the process in a key store that is not accessible outside the CPU package. In step 84, the method encrypts, for one or more of the processes, processor state data owned by a process using the encryption key assigned to the process and storing the encrypted processor state data and the process identifier in an externally accessible processor data structure. In step 85, the method decrypts a requested portion of the encrypted processor state data stored in the processor data structure and providing the decrypted processor state data to a requesting process in response to receiving a read request from the requesting process having a process identifier that matches the process identifier stored in the processor data structure along with the requested processor state data.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage medium (including forms referred to as volatile memory) is, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored as non-transitory program instructions in a computer readable storage medium that can direct a computer, other programmable data processing apparatus, or other devices to function in a particular manner, such that the program instructions stored in the computer readable storage medium produce an article of manufacture including non-transitory program instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A CPU package comprising:
a first processor core forming an instruction path for handling a plurality of processes;
a data register configured for storage of data;
a first encryption and decryption module disposed in a communication path between the instruction path and the data register; and
a key store accessible to the first encryption and decryption module, wherein the key store stores a plurality of encryption key-tag pairs including at least one unassigned key-tag pairs, wherein the key store is inaccessible outside the CPU package;
wherein the first encryption and decryption module is configured to:
assign, for each of the plurality of processes, one of the plurality of encryption key-tag pairs to the process;
encrypt and store data in the data register for each of the plurality of processes being handled in the instruction path, wherein data owned by each process is encrypted and decrypted by the first encryption and decryption module using the encryption key of the key-tag pair assigned to the process by the first encryption and decryption module, and wherein the encrypted data is stored in the data register in association with the tag of the key-tag pair assigned to the process by the first encryption and decryption module;
detect a new process being handled in the instruction path; and
assign one of the at least one unassigned key-tag pairs to the new process.

2. The CPU package of claim 1, further comprising:
a memory controller including cache memory; and
a second encryption and decryption module disposed in a communication path between the first processor core and the cache memory, wherein the second encryption and decryption module is configured to encrypt and store data in the cache memory for each of a plurality of processes being handled in the instruction path, wherein data owned by each process is encrypted and decrypted by the second encryption and decryption module using an encryption key assigned to the process, wherein the second encryption and decryption module has access to the key store.

3. The CPU package of claim 1, further comprising:
a memory controller including cache memory;
a second encryption and decryption module disposed in a communication path between the first processor core and the cache memory, wherein the second encryption and decryption module is configured to encrypt and store data in the cache memory for each of a plurality of processes being handled in the instruction path, wherein data owned by each process is encrypted and decrypted by the second encryption and decryption module using an encryption key assigned to the process; and
a second key store that is accessible to the second encryption and decryption module and is configured to store the encryption key assigned to each of the plurality of processes, wherein the second key store is inaccessible outside the CPU package.

4. The CPU package of claim 3, wherein the first and second key stores store a different encryption key for each of the plurality of processes.

5. The CPU package of claim 1, further comprising:
a second processor core, wherein the first and second processor cores share the key store.

6. The CPU package of claim 1, further comprising:
a plurality of externally accessible data structures; and
a plurality of encryption and decryption modules, each encryption and decryption module controlling data into and out of one of the externally accessible data structures.

7. The CPU package of claim 1, wherein the encryption and decryption module is configured to perform further operations comprising:
detect that a first key-tag pair store in the key store is not assigned to any of the processes, wherein the first key-tag pair was previously assigned to one of the processes; and
assign the first key-tag pair to a new process being handled in the instruction path.

8. A CPU package, comprising:
a first processor core forming an instruction path for handling a plurality of processes;
an externally accessible processor data structure;
an encryption and decryption module in a communication path between the instruction path and the externally accessible processor data structure; and
a key store accessible to the first encryption and decryption module and not accessible outside the CPU package, wherein the key store stores a plurality of encryption keys;
wherein the encryption and decryption module is configured to perform operations comprising:
determining a process identifier assigned each of a plurality of processes;
assigning, for each of the plurality of processes, one of the plurality of encryption keys to the process;
storing, for each of the processes, the process identifier assigned to the process in association with the encryption key assigned to the process in the key store;
encrypting, for one or more of the processes, processor state data owned by the process using the encryption key assigned to the process and storing the encrypted processor state data and the process identifier in the externally accessible processor data structure;
decrypting a requested portion of the encrypted processor state data stored in the processor data structure and providing the decrypted processor state data to a requesting process in response to receiving a read request from the requesting process having a process identifier that matches the process identifier stored in the processor data structure along with the requested processor state data, wherein the requested portion of the encrypted processor state data is decrypted using a first encryption key that is stored in the key store in association with the process identifier of the requesting process;
detecting that the requesting process is no longer an active process;
detecting a new process being handled in the instruction path; and
reusing the first encryption key by associating the first encryption key with a process identifier of the new process in the key store.

9. The CPU package of claim 8, wherein the operations of the encryption and decryption module further comprise:
preventing decryption of the requested portion of the encrypted processor state data stored in the processor data structure in response to receiving a read request from the requesting process having a process identifier that does not match the process identifier stored in the processor data structure along with the requested processor state data.

10. The CPU package of claim 8, wherein all externally accessible processor state data that is stored within the CPU package is encrypted with an encryption key that is specific to the process that owns the data.

11. The CPU package of claim 8, wherein the externally accessible processor data structure is selected from a buffer, register and cache memory.

12. The CPU package of claim 8, wherein the operations of the encryption and decryption module further comprise:
enabling a selected process, from among the one or more processes, to grant access to data owned by the selected process to a second process by allowing the second process to use the process identifier of the selected process.

13. The CPU package of claim 12, wherein the second process is a debugger process or a shared library.

14. The CPU package of claim 8, wherein the operations of the encryption and decryption module further comprise:
detecting that an external entity located outside of the CPU package is attempting to access the externally accessible data structure; and
determining whether the external entity has a process identifier that matches the process identifier stored along with the data being accessed.

15. The CPU package of claim 14, wherein the external entity is a debugger application running on a different computer that is externally connected to the CPU package through a debug header.

16. The CPU package of claim 8, wherein the process identifier comprises a plurality of tag bits.

17. The CPU package of claim 16, wherein the tag bits of a process are associated with all instructions of the process and all data owned by the process.

* * * * *